April 4, 1933. C. L. WINGARD 1,903,353
MEANS FOR HOLDING TOGETHER PARTS HAVING TELESCOPIC ENGAGEMENT
Filed Nov. 17, 1930 2 Sheets-Sheet 1
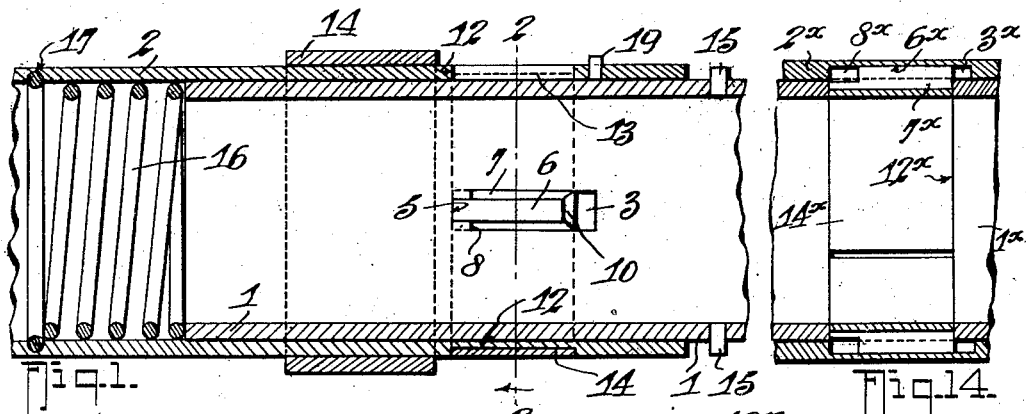
Inventor
C. L. Wingard.
By Albert R. Dietrich
Attorney April 4, 1933. C. L. WINGARD 1,903,353
MEANS FOR HOLDING TOGETHER PARTS HAVING TELESCOPIC ENGAGEMENT
Filed Nov. 17, 1930 2 Sheets-Sheet 2
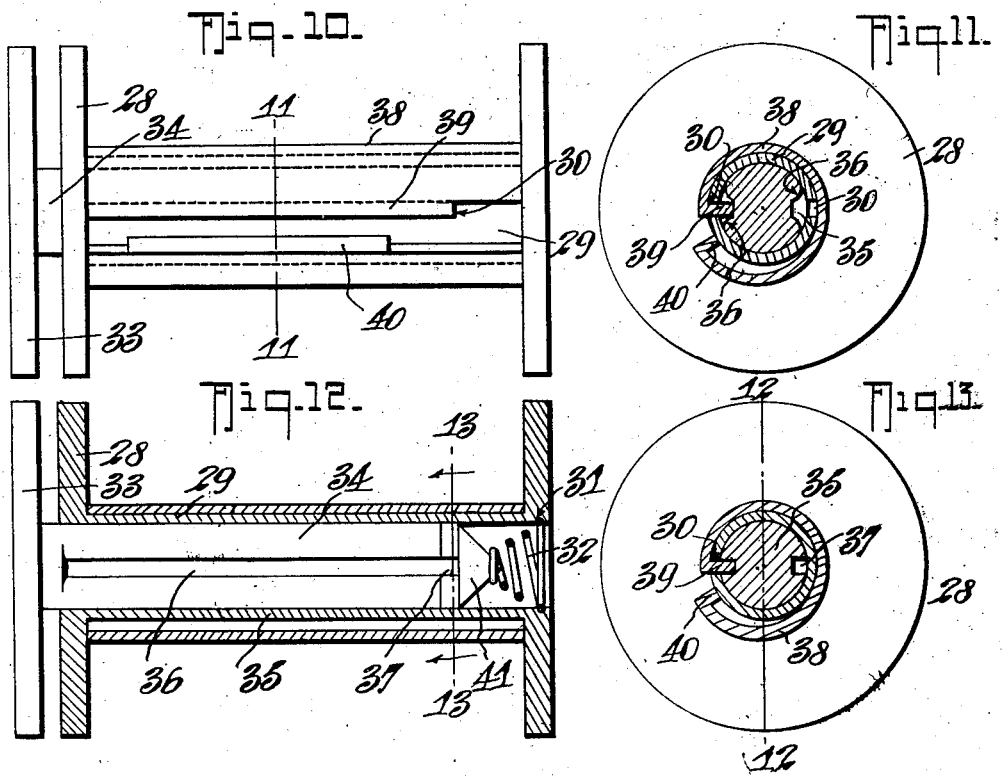
Inventor
C. L. Wingard.
By Albert E Dietrich
Attorney Patented Apr. 4, 1933

1,903,353

UNITED STATES PATENT OFFICE

CHARLES LEO WINGARD, OF PORTLAND, OREGON

MEANS FOR HOLDING TOGETHER PARTS HAVING TELESCOPIC ENGAGEMENT

Application filed November 17, 1930. Serial No. 496,263.

My invention relates to means for securing together two parts which have a telescopic or male and female engagement with one another for the purpose of preventing these parts from being separated or pulled apart under conditions of use, and/or from rotating one with respect to the other on their joint axis.

My invention is of general application and while I shall hereinafter refer to several embodiments of my invention and have illustrated the same in particular usages, the same are not to be construed as limitations but illustrations or examples only.

Another object is to provide a simple and effective means to lock two parts together either permanently or detachably accordingly as a permanent or releasable joint is to be effected.

Further, the invention has for an object to lock male and female parts together in such a way as to prevent relatively rotational movement between the parts while permitting more or less longitudinal motion to occur between them if desirable.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a central vertical longitudinal section illustrating one embodiment of the invention, showing telescopic tubular parts secured together.

Figure 2 is a cross section on the line 2—2 of Figure 1.

Figure 3 is a cross section similar to Figure 2 but with the locking keys released, and showing a slight modification.

Figure 4 is a detail sectional perspective view of a portion of the male element.

Figure 5 is a detail elevation of the end of the female element with the spring band removed, and a part of the locking key broken away.

Figure 6 is a detail perspective view of the locking key shown in Figures 1 to 3 inclusive and Figure 5.

Figure 7 is a detail perspective view of a modified form of locking key.

Figure 8 is a detail longitudinal section of a joint showing another modified form of locking key.

Figure 9 is an end elevation of the locking key shown in Figure 8.

Figure 10 is an elevation of another embodiment of the invention.

Figure 11 is a cross section on the line 11—11 of Figure 10.

Figure 12 is a vertical longitudinal section on the line 12—12 of Figure 13.

Figure 13 is a cross section on the line 13—13 of Figure 12.

Figure 14 is a detail sectional view of a modification hereinafter specifically referred to.

It is, of course, to be understood that the terms employed throughout this specification are merely descriptive of the invention and do not define the same; the appended claims make clear the scope of the invention.

In the drawings, in which like numerals of reference indicate like parts in all of the figures, and referring particularly to the embodiment illustrated on sheet 1 of the drawings, 1 represents the male member which, in the embodiments referred to, is of tubular nature and fits telescopically within the female member (tubular) 2 as shown.

In the embodiment illustrated in Figures 1 to 6 inclusive, the male member 1 is provided with one or more slots 3 having reduced extensions 5 at the front end. The female member also has slots 4 corresponding in length to the unreduced portion of the slots 3. The slots 4 and 3 receive the keys 6, the construction of which is best shown in Figures 6, 7, 8 and 9, the key of Figure 6 being the one shown in Figures 1, 2, 3 and 5.

Each key comprises an elongated body of a length approximately equal to that of the slot 4 and fits the slot with a sliding fit. The body of the key 6 has inclined or tapered side walls 7 to fit the inclined side walls 20 of the slot 4. When placed in the slot 4 the key 6 will enter a registering slot 3 (see Figure 2) and the key has that end, which is adjacent the reduced portion 5 of the slot, recessed with straight or parallel walls as at 8 to leave a tongue 9 for entering the slot portion 5 when the male and female members are pulled in a direction tending to separate them. Since the side walls of the slot extension 5 and the corresponding walls of the tongue 9 are parallel, i. e., not tapered as are the walls 20 and 7, rotation of the male and female members with respect to one another on their common axis cannot occur and as the abutting ends of the key 6 and the wall of the slot extension 5 are not inclined (as is the opposite end 10 of the key 6), the male and female members cannot be pulled apart.

In order to separate the male and female members it is necessary first to press them together lengthwise in order to bring the slot extension 5 out of the recesses 8 of the key, then by rotating the male and female members one around the other (see Figure 3) the key or keys will ride out of the slots 3 onto the periphery of the male member, whereupon the male and female members may be pulled apart.

As illustrated in Figures 1, 2, 3 and 5 the female member 2 has an outer annular groove 11 whose side walls are preferably parallel in order to retain a split spring band 14 which embraces the key or keys and continuously tends to force them to the locking position. The band 14 may have a bent-over or hook end 13 to lie in the slot 12 in the female member (see Figs. 1 and 2) which prevents the band swivelling in its groove, or the ends of the band may simply abut a bar or ridge 12y formed across the groove (see Fig. 3).

In order to limit the telescopic movement of the male member into the female member, any suitable stop or stops 15 may be provided, the object being to limit the inward movement so that when at its extreme the slots 4 and 3 will exactly register.

In order to render the interlocking of the tongue 9 and the slot extension 5 automatic, a coil spring 16 may be provided which abuts the end of the male member 1 and is suitably anchored at 17 within the female member.

When desired, as when a more positive locking together of the members is wanted, i. e., when rotation of the male and female members with respect to one another is to be more forcibly restrained than is possible simply by the spring band 14, a ferrule 18 may be slidably mounted on the female member 2 so as to be projectible over the band 14 and hold it against expanding sufficiently to allow the keys to be released, i. e., to assume the position of Figure 3. The ferrule 18 may be moved into position over the band 14 in any desired way as by hand or by gravity and when desired a suitable stop 19 may be provided for holding the ferrule against moving past the band 14 or off the female member. The ferrule may be split if desired and caused to grip the female member with sufficient friction and to hold it against accidental displacement.

In order that the male member may pass the key in entering the female member, either the end of the male member must be bevelled or the adjacent end of the key must be bevelled. When the male member is a thin tube I prefer to place the bevel on the end of the key, see 10 in Figures 1 and 6.

Should it be desirable to lock the male and female members together both against longitudinal and rotational movement relatively one to the other, I use a key such as is shown in Figure 7. By reference to this figure it will be seen that the portion of the key 24 which enters the slot 3 has its side walls 26 and its inner end wall parallel to the walls of the slot proper 3 and no recesses, such as the recesses 8, are provided in this key. That part of the key which lies in the slot 4 has its side walls bevelled as at 25 to fit the bevels 20 while the ends of the key are straight as well as the ends of the slot 4.

With this key, when the parts are assembled, it will not be possible to disconnect the parts save by removing the spring band 14.

The bevel 27 of the key 24 corresponds in location and function to the bevel 10 of the key 6.

When the full bore of the male member is to be utilized, i. e. if the requirements of practice are such that the inside of the male member must be kept free of obstructions, the depth of the key is only the combined thickness of the walls of the male and female members 1 and 2, see Figures 1, 2 and 3. When, however, it is not necessary to keep the inside entirely free of projections, I may use the key shown in Figures 8 and 9, by reference to which figures, it will be observed that the key 21 has its recesses formed as longitudinal grooves 22 in the sides. This leaves an overhanging portion at 23 to underlie the male member at the side of the extension 5 of the slot 3 and prevents the key from riding up even though the spring band 14 is not present or has become weakened.

Instead of the keys and spring band being carried by the female member, a reversal of the parts may be employed and the spring band and keys located inside the male member, thus leaving the outer surface of the female member free of interruptions, such a reversal of parts is illustrated in Figure 14, in which all those parts having the same general construction and performing the same function as corresponding parts in Figure 1, bear the same reference numerals plus the index letter $x$. As the reversal is an obvious one and is clearly illustrated in Figure 14, further description thereof is thought to be unnecessary.

Referring now to sheet 2 of the drawings and particularly to Figures 10 to 12 inclusive, I have shown a modification of the invention in its application to a bobbin or spool mounted on a spindle. For example the spindle may be one of a typewriter ribbon feed and the bobbin may be a typewriter ribbon carrier, or the spindle may be that of a spinning machine and the bobbin the yarn or thread carrier, the specific use being immaterial. In these figures, Figures 10 to 13 inclusive, 28 represents the bobbin or spool whose tubular hub 29 has a longitudinal slot 30 to receive one of the locking ribs 39 or 40 of the spring band 38 which encircles the hub 29. The locking rib or key 39 is preferably of the same length as the slot 30 while the other one 40 is shorter in order to allow more longitudinal movement, when the key 40 is placed in the slot, between the spindle and bobbin than when the longer key 39 is placed in the slot.

If found desirable the bobbin 28 may be provided with a helical spring 32 anchored at 31 in one end of the hub 29 in order that it may be engaged by the point 41 of the spindle shaft 34 so as to keep the locking key 39 or 40, as the case may be, in the straight walled portion 37 of the groove or slot 35 of the spindle shaft 34, the remainder of the groove or slot 35 having its side walls bevelled or curved as at 36 so that when the bobbin 28 and spindle 33 are pushed together against the tension of the spring 32 to withdraw the key from the slot portion 37, the male and female members (spindle and bobbin) may be turned with respect to themselves to bring the key out of the slot or groove 35 and enable the said members to be separated.

When the structure shown in Figures 10 to 13 inclusive is employed, the thread or ribbon to be wound on the bobbin may have its end caught under the portion 40 (or 39 accordingly as 39 or 40 is adjusted to lie in the slot 30) and held thereby as a clasp.

The male member may be of any desired length and in either of the embodiments of the invention it may be provided with a series of slots 3, 30, 48, etc. spaced apart longitudinally so that the members may be secured together with the male member at different distances within the female member.

Other modifications of the invention will be obvious to those skilled in the art and may be made under the scope of the invention as expressed in the appended claims.

What I claim is:

1. Means for securing the joints of male and female members together, which means comprises a spring band carried by one of said members, a locking member cooperating with said band, each said male and female member having provisions in part to receive said locking member whereby said locking member will hold said joint against separation, said members being arranged to be brought together and locked by said locking member upon insertion of the male member into the female member with rectilinear movement along the axes of the members, and means which upon relative rotation of said male and female members on their axes will cause said locking member to become released to provide for separation of said male and female members when desired.

2. Means for securing the joints of male and female members together, which means comprises a spring band carried by one of said members, a locking member cooperating with said band, each said male and female member having provisions in part to receive said locking member whereby said locking member will hold said joint against separation, said provisions comprising a slot in the female member through which said locking member may in part project, and a recess in the male member to receive the projecting part of said locking member, said members being arranged to be brought together and locked by said locking member upon insertion of the male member into the female member with rectilinear movement along the axes of the members, and means which upon relative rotation of said male and female members on their axes will cause said locking member to become released to provide for separation of said male and female members when desired.

3. Means for holding male and female parts together, the same comprising in combination with a tubular female element and a male element associated therewith, one of said elements having a slot, a locking key located in said slot, the other of said elements having a seat into which said key may project to hold said male and female elements against pulling apart, and a yieldable means continuously tending to hold said key to its seating position, said members being arranged to be brought together and locked by said locking member upon insertion of the male member into the female member with rectilinear movement along the axes of the members and means which upon relative rotation of said male and female members on their axes will cause said locking member to become released to provide for separation of said male and female members when desired.

4. Means for holding male and female parts together, the same comprising in combination with a tubular female element and a male element associated therewith, one of said elements having a slot, a locking key located in said slot, the other of said elements having a seat into which said key may project to hold said male and female elements against pulling apart, and a yieldable means continuously tending to hold said key to its seating position, and another means engageable with said yieldable means when desired to render same non-yieldable, said members being arranged to be brought together and locked by said locking member upon insertion of the male member into the female member with rectilinear movement along the axes of the members.

5. Means for holding male and female parts together, the same comprising in combination with a tubular female element and a male element associated therewith, one of said elements having a slot, a locking key located in said slot, the other of said elements having a seat into which said key may project to hold said male and female elements against pulling apart, and a yieldable means continuously tending to hold said key to its seating position, said yieldable means comprising a split band spring, said members being arranged to be brought together and locked by said locking member upon insertion of the male member into the female member with rectilinear movement along the axes of the members and means which upon relative rotation of said male and female members on their axes will cause said locking member to become released to provide for separation of said male and female members when desired.

6. Means for holding male and female parts together, which parts are arranged to be brought together and separated by rectilinear movement along the axis of the members, the same comprising in combination with a tubular female element and a male element associated therewith, one of said elements having a slot, a locking key located in said slot, the other of said elements having a seat into which said key may project to hold said male and female elements against pulling apart, a yieldable means continuously tending to hold said key to its seating position, said yieldable means comprising a split band spring, and a ferrule to fit over said band spring and hold it rigid when desired.

7. Means to hold male and female parts together, which means comprises in combination with engaging male and female elements; a locking key and a band spring cooperating therewith, said male and female elements having provision to receive said key between them, said members being arranged to be brought together and locked by said locking member upon insertion of the male member into the female member with rectilinear movement along the axes of the members and means which upon relative rotation of said male and female members on their axes will cause said locking member to become released to provide for separation of said male and female members when desired.

8. Means to hold male and female parts together, which means comprises in combination with engaging male and female elements; a locking key, said male element having key receiving and retaining slots and an annular groove associated with said slots, a band spring in said groove and embracing said key to partly project said key toward the male element, said male element having a slot to receive said key, said members being arranged to be brought together and locked by said locking member upon insertion of the male member into the female member with rectilinear movement along the axes of the members, and means which upon relative rotation of said male and female members on their axes will cause said locking member to become released to provide for separation of said male and female members when desired.

9. Means to hold male and female parts together, which means comprises in combination with engaging male and female elements; a locking key, said male element having key receiving and retaining slots and an annular groove associated with said slots, a band spring in said groove and embracing said key, to partly project said key toward the male element, said male element having a slot to receive said key and means to anchor one end of said spring to the element which carries it.

10. Means to hold male and female parts together, which means comprises in combination with engaging male and female elements; a locking key, said male element having key receiving and retaining slots and an annular groove associated with said slots, a band spring in said groove and embracing said key to partly project said key toward the male element, said male element having a slot to receive said key, and having a reduced extension to fit said slot, said key having recesses at one end providing a tongue to fit said extension when the male and female elements are pulled in a direction tending to separate them.

11. Means to hold male and female parts together, which means comprises in combination with engaging male and female elements; a locking key, said male element having key receiving and retaining slots and an annular groove associated with said slots, a band spring in said groove and embracing said key to partly project said key toward the male element, said male element having a slot to receive said key, and having a reduced extension to fit said slot, said key having recesses at one end providing a tongue to fit said extension when the male and female elements are pulled in a direction tending to separate them, said recesses comprising side grooves in the key to receive the male member and interlock therewith and to hold said key against movement radially.

12. Means to hold male and female parts together, which means comprises in combination with engaging male and female elements; a locking key, said male element having key receiving and retaining slots and an annular groove associated with said slots, a band spring in said groove and embracing said key to partly project said key toward the male element, said male element having a slot to receive said key, and means continuously tending to separate said male and female parts.

13. Means to hold male and female parts together, which means comprises in combination with engaging male and female elements; a locking key, said male element having key receiving and retaining slots and an annular groove associated with said slots, a band spring in said groove and embracing said key, means to anchor one end of said band spring to partly project said key toward the male element, said male element having a slot to receive said key, and means continuously tending to separate said male and female parts.

14. Means to hold male and female parts together, which means comprises in combination with engaging male and female elements; a locking key, said male element having key receiving and retaining slots and an annular groove associated with said slots, a band spring in said groove and embracing said key to partly project said key toward the male element, said male element having a slot to receive said key, and having a reduced extension to fit said slot, said key having recesses at one end providing a tongue to fit said extension when the male and female elements are pulled in a direction tending to separate them, and means continuously tending to separate said male and female parts.

15. Means to hold male and female parts together, which means comprises in combination with engaging male and female elements; a locking key, said male element having key receiving and retaining slots and an annular groove associated with said slots, a band spring in said groove and embracing said key to partly project said key toward the male element, said male element having a slot to receive said key, and having a reduced extension to fit said slot, said key having recesses at one end providing a tongue to fit said extension when the male and female elements are pulled in a direction tending to separate them, said recesses comprising side grooves in the key to receive the male member and interlock therewith and to hold said key against movement radially, and means continuously tending to separate said male and female parts.

16. Means to hold male and female parts together, which means comprises in combination with engaging male and female elements; a locking key and a band spring cooperating therewith, said male and female elements having provision to receive said key between them, and the aforesaid structure including means whereby upon rotation of said male and female parts with respect one to the other, said key will be released from its locking position to enable said male and female parts to be separated.

17. A pair of bodies, one having an internal tubular hub and the other having an internal spindle adapted, when said bodies are brought together, to enter and be received by said hub as a male and female joint, and means within said body operating upon the male and female joint being made to lock the bodies together, the slot in the male element being longer than said locking member and having a portion not less than the length of said locking member rounded off and the remaining portion squared so that when the locking member lies projected into said squared portion the bodies cannot be rotated with respect to one another and when said bodies are moved relatively along their axes to bring said locking member wholly into said rounded off portion of the slot, rotation may be effected to release the lock.

18. Means for securing the joints of male and female members together, which members are arranged to be brought together and locked by a rectilinear movement along the axes of the members and unlocked by a relative rotary movement of the members around their axes, which means comprises a spring band carried by one of said members, a locking member cooperating with said band, each said male and female member having provisions in part to receive said locking member whereby said locking member will hold said joint against separation by a pull in the direction of the axes, said locking member having provisions for releasing itself from locking engagement upon relative rotation of the male and female members on their axes.

19. Means for securing the joints of male and female members together, which members are arranged to be brought together and locked by a rectilinear movement along the axes of the members and unlocked by a relative rotary movement of the members around their axes, which means comprises a spring band carried by one of said members, a locking member cooperating with said band, each said male and female member having provisions in part to receive said locking member whereby said locking member will hold said joint against separation by a pull in the direction of the axes, said locking member having provisions for releasing itself from locking engagement upon relative rotation of the male and female members on their axes, and a ferrule adapted to be moved into position over said spring band to hold it against yielding to retain the male and female members against being unlocked by the aforesaid rotary movement.

CHARLES LEO WINGARD.